R. P. JACKSON.
PROTECTIVE DEVICE.
APPLICATION FILED JAN. 7, 1914.
1,177,334.
Patented Mar. 28, 1916.
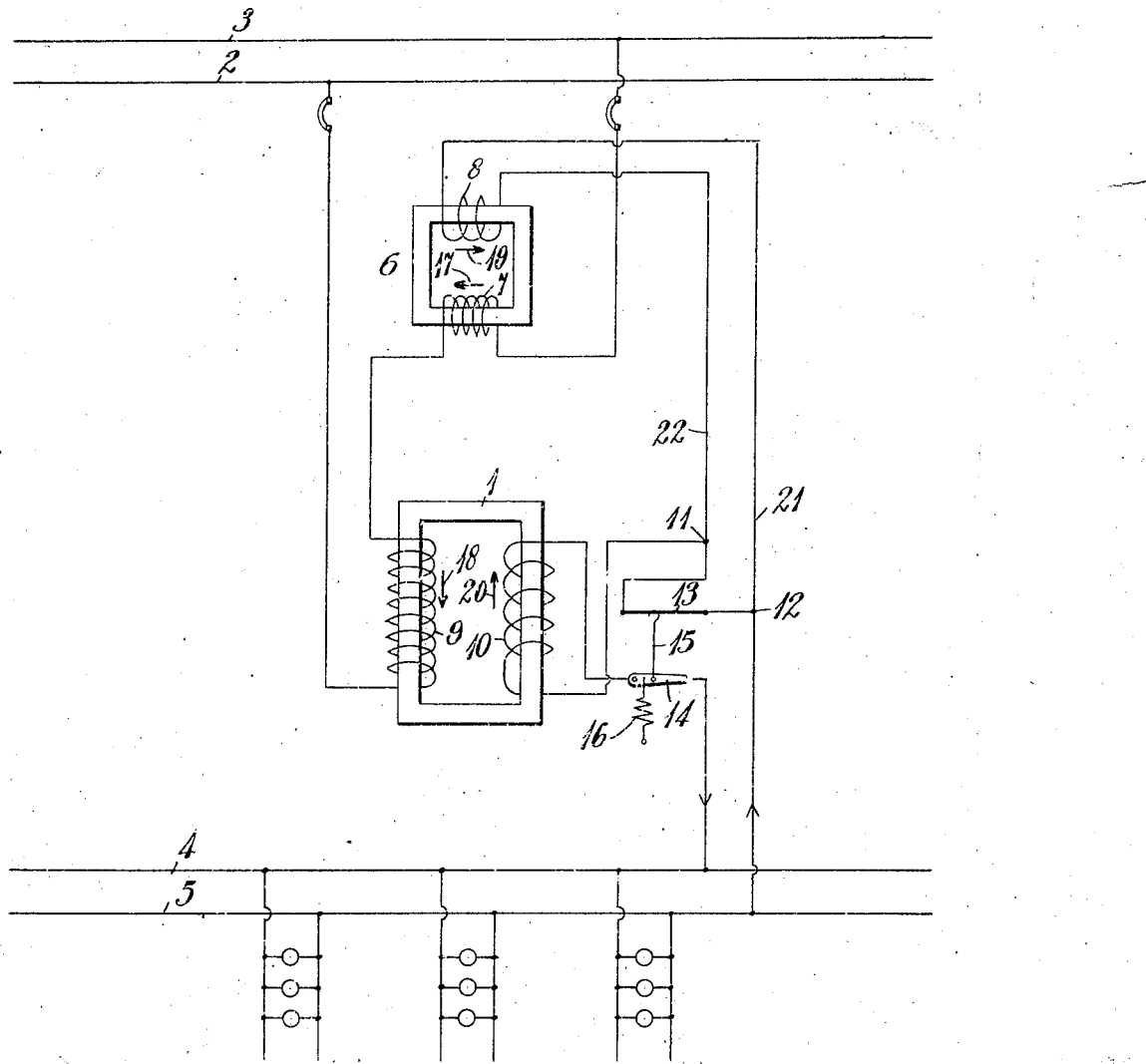

UNITED STATES PATENT OFFICE.

RAY P. JACKSON, OF EDGEWOOD PARK, PENNSYLVANIA, ASSIGNOR TO WESTINGHOUSE ELECTRIC AND MANUFACTURING COMPANY, A CORPORATION OF PENNSYLVANIA.

PROTECTIVE DEVICE.

1,177,334.     Specification of Letters Patent.     Patented Mar. 28, 1916.

Application filed January 7, 1914. Serial No. 810,788.

*To all whom it may concern:*

Be it known that I, RAY P. JACKSON, a citizen of the United States, and a resident of Edgewood Park, in the county of Allegheny and State of Pennsylvania, have invented a new and useful Improvement in Protective Devices, of which the following is a specification.

My invention relates to protective means, and particularly to protective devices which will automatically operate to so disconnect defective electrical apparatus from a distributing circuit as to insure continuity of service.

In alternating current systems, it is usual to supply power to distributing mains from a plurality of transformers connected in multiple in order to provide better voltage regulation at the customers' premises. This arrangement is objectionable because, when one of the transformers burns out or becomes short circuited, a reverse flow of current from the distributing mains traverses the short circuited transformer and thus imposes additional load upon the remaining transformers connected in multiple. Consequently, these remaining transformers must supply the power previously supplied by the short circuited transformers and, in addition, carry, as load, the short circuited transformer which causes a heavy demand for power.

It is customary to supply fuses between the secondary winding of a transformer and the distributing mains, the capacity of the fuses being equal to the maximum output of the transformer. Therefore, it is necessary that the reverse-current flow through the secondary of a defective transformer must equal the rating of the fuse before the defective transformer is disconnected from the distributing circuit.

When a large number of transformers are connected in multiple, the extra load imposed upon each is relatively small, but, by reason of the drop in voltage in the secondary mains, the transformer nearest the defective transformer is called upon to carry a substantially larger portion of the load than the more remote transformers, thus causing an excess current to be delivered therefrom and, as a result, its protective fuse is blown. Similarly, the next nearest transformer will be disconnected from the circuit and, in the end, all the transformers will be disconnected, because of the excessive overloads.

One object of my invention is to provide a protective means which will automatically operate to disconnect defective transformers from distributing mains.

Another object of my invention is to provide simple and inexpensive means for performing the above-mentioned function which is easy to install and requires no periodical inspections or delicate adjustments.

In the accompanying drawing, I have illustrated diagrammatically a distributing system embodying a form of my invention. Only one distributing transformer is shown, but it will be understood that any number may be provided which will adequately supply the power demanded from the secondary mains.

A transformer 1 steps down the high-tension voltage impressed upon primary mains 2 and 3 to a voltage suitable for the secondary or distributing mains 4 and 5. Associated with the distributing transformer 1 is an auxiliary transformer 6 provided with a primary winding 7 and a secondary winding 8. The primary winding 7 and the secondary winding 8 are connected in series relation, respectively, with a primary winding 9 and a secondary winding 10 of the distributing transformer 1. The windings 7 and 8 of the auxiliary transformer 6 have the same ratio of ampere turns as that of windings 9 and 10 of the distributing transformer 1. The auxiliary transformer 6 may be considered as a current or series transformer in which the value of the current in the secondary winding 8 is equal, at all times, to the current traversing the secondary winding 10 of the main transformer 1. A current-responsive means, such as a fuse 13, is connected between the points 11 and 12 of the circuit of the secondary winding 8 of the transformer 6. A switch 14 is adapted to disconnect the secondary winding 10 from the distributing mains when holding means 15 are released by reason of the action of the current-responsive means 13. A tensional element 16 actuates the switch 14 to disconnect the main transformer from the distributing mains.

The ratios of ampere turns between primary and secondary windings of the transformers 1 and 6 are equal, the primary windings 7 and 9 of the transformers being so connected that the current traverses each in the same direction, as indicated by arrows 17 and 18. The direction of current flow in the secondary windings 8 and 10, as a result of the aforementioned current flow in the respective primary windings, is indicated by arrows 19 and 20, respectively. Inasmuch as the current flow in the secondary winding 8 equals the current flow in the secondary winding 10, under normal operating conditions, the resultant current flow through the fuse 13 is neutralized and, consequently, all the current supplied to the distributing mains 4 and 5 must flow through the windings 8 and 10 in series relation.

To further explain the normal current flow through the above-mentioned secondary windings, consider the current as flowing in the following circuit, namely, through the secondary winding 10 in the direction indicated by the arrow 20, the switch 14, the primary mains 4 and 5, a lead 21, the secondary winding 8 in the direction indicated by the arrow 19, and a lead 22 to the secondary winding 10. As previously explained, the potential drop through the fuse 13 between the points 11 and 12 is neutralized, thereby preventing any current flow therethrough.

In the event of transformer 1 becoming short-circuited or burned out, the current supplied to the distributing mains 4 and 5 from the other transformers (not shown) of the system, flows in a reverse direction through the secondary coil 10. This reversed current flow destroys the neutralization of potential across the points 11 and 12 and causes a large quantity of current to flow through the fuse 13 which is adapted to be ruptured at a predetermined current flow. As the fuse 13 releases the holding means 15, the switch 14 is actuated, thereby disconnecting the secondary coil 10 from the distributing mains. This action imposes upon the remaining transformers the load previously carried by the transformer 1, but it protects said transformers from the heavy demand of current which would be required by the transformer 1 provided it were not disconnected from the distributing circuit.

If the transformer 1 becomes defective and destroys the normal ratio between the primary and secondary ampere turns, the potential drop between the points 11 and 12 will not be neutralized and, consequently, a resultant current flow may traverse the fuse 13. In this event, the fuse 13 may be so rated as to blow out when a small amount of current flows through it, thereby releasing or disconnecting the switch 14. While I have shown a fuse 13, it will be understood that any current-responsive device may be inserted and arranged to be actuated when the neutralization of the current flow between the points 11 and 12 is destroyed.

It will be understood that my invention is not limited to the specific apparatus disclosed but may be embodied in any suitable means for normally neutralizing or reducing to a substantially low value the current flow through a current-responsive protective device.

I claim as my invention:

1. The combination with a main and an auxiliary transformer each having primary and secondary windings, the ratio of transformation of both transformers being equal and their corresponding windings being connected in series relationship, of current-responsive means connected in circuit with one of said groups of transformer windings and serving to disconnect them from circuit, the current flow through said current-responsive means being neutralized under normal conditions.

2. The combination with a main and an auxiliary transformer each having primary and secondary windings which are connected in groups comprising corresponding windings, of current-responsive means connected in circuit with one of said groups of windings in order to disconnect them from circuit when abnormal conditions obtain, the electromotive force normally impressed upon said current-responsive means being neutralized.

3. The combination with a main and an auxiliary transformer each having primary and secondary windings which are connected in groups comprising corresponding windings, the ratio of transformation of said transformers being equal, of current-responsive means connected to one of said groups of windings in order to disconnect them from circuit when a predetermined value of current flows in said current-responsive means, the electromotive force impressed thereupon being neutralized under normal conditions, said current-responsive means being subjected to a potential difference when the ratio of transformation of either of said transformers is disturbed.

4. An alternating-current distributing system comprising primary mains, secondary mains, a main transformer, an auxiliary transformer, the primary windings and secondary windings respectively of said transformers being connected in series relationship, and current-responsive means connected in shunt to said secondary winding of the auxiliary transformer and serving to disconnect said secondary winding of the main transformer from the secondary mains, the current flow through said current-responsive means being neutralized under normal conditions.

5. An alternating-current distributing system comprising primary mains, secondary mains, a main transformer, an auxiliary transformer, the primary windings and secondary windings respectively of said transformers being connected in series relationship, and current-responsive means connected in shunt to said secondary winding of the auxiliary transformer and in series with said secondary winding of the main transformer, the current flow through said current-responsive means being neutralized under normal conditions.

6. An alternating current distributing system comprising primary mains, secondary mains, a main transformer interposed therebetween, an auxiliary transformer the secondary winding of which is connected in series relation with a winding of the main transformer, and current-responsive means for disconnecting the main transformer from circuit when a predetermined current flows through said current-responsive means, said transformer windings being electrically connected to the current-responsive means to neutralize normally the current flow therethrough.

7. An alternating current distributing system comprising primary mains, secondary mains, a main transformer, an auxiliary transformer, current-responsive means to disconnect one transformer from circuit when traversed by a predetermined current flow, and windings on said transformers that are electrically connected to said current-responsive means to normally neutralize current flow therethrough.

8. An alternating current distributing system comprising primary mains, secondary mains, a main transformer, an auxiliary transformer, and a current-responsive means for disconnecting the main transformer from the secondary mains, secondary windings of said transformers being interconnected to normally neutralize the current flow through the current-responsive means.

9. An alternating current distributing system comprising primary mains, secondary mains, a main transformer interposed therebetween, an auxiliary transformer, and current-responsive means electrically connected in multiple with a secondary winding of the auxiliary transformer and in series with a secondary winding of the main transformer in order to disconnect the said secondary winding of the main transformer from the circuit, said transformer windings being adapted to neutralize normally the current flow through the current-responsive means.

In testimony whereof, I have hereunto subscribed my name this 31st day of Dec., 1913.

RAY P. JACKSON.

Witnesses:
 GOLDIE E. MCGEE,
 B. B. HINES.